United States Patent [19]

van Duin et al.

[11] Patent Number: 4,786,380

[45] Date of Patent: Nov. 22, 1988

[54] METHOD FOR THE ELECTROLYTIC PREPARATION OF HYPOCHLORITE IN FLOWING SALT-CONTAINING WATER

[75] Inventors: Pieter J. van Duin, Noordwijk; Antonius M. C. P. de Jong, Pijnacker, both of Netherlands

[73] Assignee: Nederlandse Centrale Organisatie Voor Toegepast-Natuurewetenschappelij Onderzoek, Netherlands

[21] Appl. No.: 849,775

[22] Filed: Apr. 9, 1986

[30] Foreign Application Priority Data

Apr. 15, 1985 [NL] Netherlands ................. 8501104

[51] Int. Cl.$^4$ ................................. C25B 1/24
[52] U.S. Cl. ........................ 204/95; 204/149; 204/284; 204/292; 204/294
[58] Field of Search ............... 204/95, 284, 292, 294, 204/149, 151, 152

[56] References Cited

U.S. PATENT DOCUMENTS

| | | | |
|---|---|---|---|
| 3,222,269 | 12/1965 | Stanton | 204/95 |
| 3,925,174 | 12/1975 | Eng et al. | 204/95 |
| 4,108,754 | 8/1978 | Fleet | |
| 4,118,305 | 10/1978 | Oloman et al. | 204/95 |
| 4,308,124 | 12/1981 | Pellegri | 204/95 |
| 4,326,938 | 4/1982 | Das Gupta et al. | 204/294 |
| 4,360,417 | 11/1982 | Reger et al. | 204/294 |
| 4,370,214 | 1/1983 | Kadija | |
| 4,422,919 | 12/1983 | Fabian et al. | |
| 4,439,303 | 3/1984 | Cocchi | 204/294 |
| 4,444,631 | 4/1984 | Bommaraju et al. | 204/284 |
| 4,445,990 | 5/1984 | Kim et al. | 204/294 |
| 4,545,886 | 10/1985 | de Nora et al. | 204/284 |

FOREIGN PATENT DOCUMENTS

| | | |
|---|---|---|
| 0075662 | 4/1983 | European Pat. Off. |
| 2733731 | 2/1978 | Fed. Rep. of Germany |
| 1567724 | 5/1980 | United Kingdom |
| 1294357 | 1/1983 | United Kingdom |

Primary Examiner—T. Tung
Attorney, Agent, or Firm—Brumbaugh, Graves, Donohue & Raymond

[57] ABSTRACT

Method for the electrolytic preparation of hypochlorite in flowing salt-containing water for the purpose of disinfecting swimming baths, massage baths, drinking water etc. by means of an electrolysis reactor comprising a "scale-retarding" cathode having an open structure and a specific surface of at least 10 cm$^2$/cm$^3$.

11 Claims, 1 Drawing Sheet

RATE OF PRECIPITATION OF CaCO$_3$ ON A FIBRE ELECTRODE AS A FUNCTION OF THE GEOMETRICAL CURRENT DENSITY

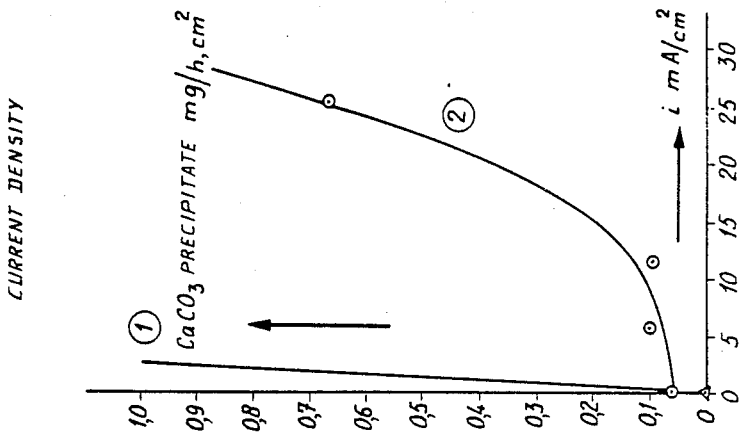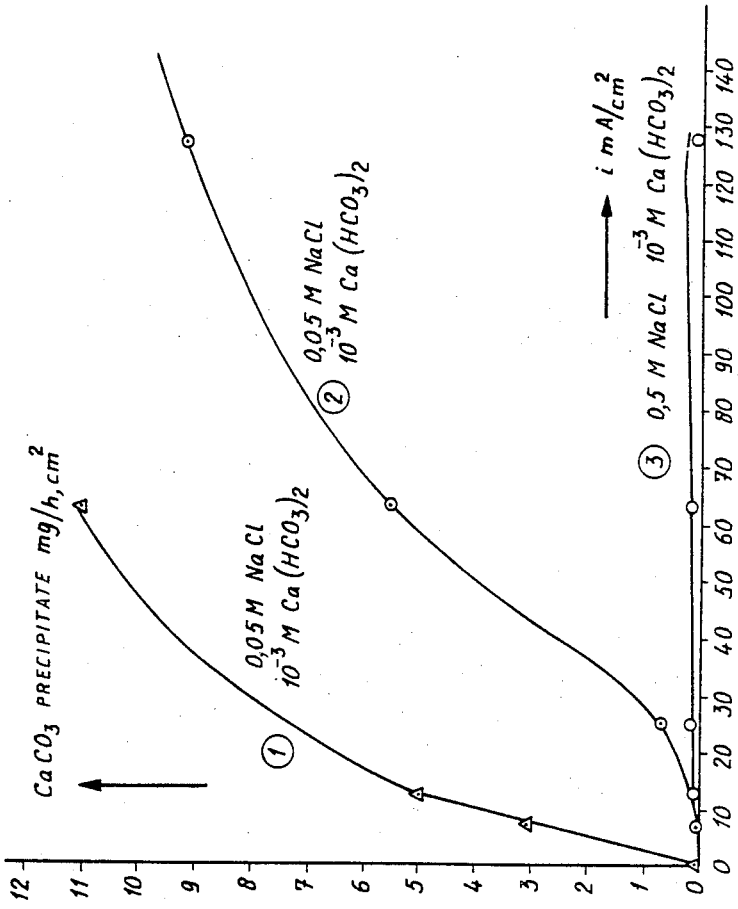

METHOD FOR THE ELECTROLYTIC PREPARATION OF HYPOCHLORITE IN FLOWING SALT-CONTAINING WATER

The invention relates to a method for the electrolytic preparation of hypochlorite in flowing salt-containing water in which the formation of deposits on the cathode is considerably reduced.

In the electrolytic production of hypochlorite for the purpose of, for example, disinfecting swimming baths, massage baths, drinking water, cooling water circuits of inter alia electricity stations and waste water, problems generally arise in view of the fact that precipitate formation ("scaling") occurs at the cathode. In this "scaling process" many types of insoluble compounds are produced such as calcium and magnesium hydroxide and carbonate, as a result of which after a relatively short time the cathode becomes inactive and the reactor becomes clogged up.

For this reason considerable research has been carried out in relation to the removal, prevention or reduction of such precipitates. Examples of solutions of this problem are the regular rinsing with acid (in which the precipitates are dissolved), flowing through the electrolysis cell at very high speed (at these speeds the local pH rise is so small that "scaling" does not occur or scarcely occurs), regular reversing of the polarity of the electrodes and also the preliminary softening of the water to be used. However, none of these solutions has resulted in an economically usable technique.

A particular solution for the above-mentioned problem is described in U.S. Pat. No. 3,974,051. More particularly, this U.S. Pat. No. relates to a method for reducing the deposits on the cathode in the electrolysis of salt-containing water, in which process (a) the cathode in the electrolysis cell has a flat continuous shape, the surface of the cathode having to have a roughness of less than $2.54 \times 10^{-4}$ cm, and (b) the salt solution is fed between the flat cathode and the parallel anode situated opposite it at a speed of from a minimum of 0.3 m/sec to a maximum value which corresponds to the result of the formula: Log $v = 1.0 - [Cl_2]/4$ with the speed v in m/s and $[Cl_2]$ in g/l. In addition to the restriction on the feed-through speed of the solution to be subjected to electrolysis, said U.S. Pat. No. 3,974,051 specifies the use of a cathode with a very smooth surface. In this manner, apparently, the adhesion of seed crystals or deposits to the cathode is made difficult. Such cathodes according to said U.S. Patent Specification are constructed of metals such as titanium, nickel and many types of iron and nickel alloys.

It has emerged however that the method described in U.S. Pat. No. 3,974,051 has a few disadvantages. On the one hand, in particular expensive cathodes with a very flat surface have to be used, while on the other hand, the electrolysis device used according to the said patent specification, which device comprises a multiplicity of flat plate electrodes, because of the shape thereof, is restricted to a certain optimum as regards the yield of hypochlorite. This last disadvantage is associated with the oxidation, which possibly occurs, of the hypochlorite ion formed at the anode, as a result of which the current efficiency is adversely affected.

It has been found that the above-named disadvantages can be eliminated if an electrolysis reactor is used, the cathode of which has an open structure and also a specific surface area of at least 10 cm$^2$/cm$^3$. Advantageously such a cathode has a surface area of 100–600 cm$^2$/cm$^3$. The cathodes according to the invention can be constructed from fibre bundles, felt and fabrics based on, for example, graphite or carbon fibres or even metal fibres. Moreover, cathodes according to the invention can be constructed as sponge-like materials, for example a porous metal or in the form of granular stacks of, for example, small metal balls or graphite grains smaller than 1 mm. These last systems have a specific surface area of, for example, 10 cm$^2$/cm$^3$ or more. If the cathode according to the invention consists of a material constructed of fibres, said fibres have, e.g. a thickness in the range of 2–25 μm and the material has a porosity of 0.7–0.98. With advantage, fibres with a thickness of 5–15 μm are used. Metal fibres of e.g. stainless steel being relatively strong may have above thickness of 2 μm.

When the cathode according to the invention is used in electrolysis reactors for the electrolytic preparation of hypochlorite in flowing salt-containing water, the formation and deposition of precipitates take place much more slowly than for the cathodes known from the prior art.

A further advantage of the cathode, according to the invention and based on, for example, graphite or carbon fibres is the low cost price, which is considerably lower than that of the metal cathodes known from the prior art, for example by a factor of 100. For this reason it is generally economically justified simply to replace a cathode contaminated after a considerable operating time by a new cathode so that a cathode regeneration process to be carried out separately can be omitted. Such an advantage is appealing in particular when using the method according to the invention for the purpose of swimming baths and the like, where facilities for such a cathode regeneration are now available or scarcely available. At the same time it may be quoted as an advantage of the method according to the invention that because of the high porosity of the cathode and the low liquid speed in the electrolysis reactor the fall in pressure through the electrolysis reactor can be low in comparison with that according to the present prior art.

In the example below a platinum electrode is used as comparison electrode according to the prior art, of which it is generally known that it has a fairly smooth surface (compare U.S. Pat. No. 3,974,051).

EXAMPLE

By means of this test the rate of precipitation of CaCO$_3$ on a fibre electrode is measured as a function of the geometrical current density. The water used in this test contained 10$^{-3}$M Ca(HCO$_3$)$_2$ and 0.05M NaCl.

For comparison use was made of a platinum gauze cathode and a carbon fibre electrode was used as cathode according to the invention. This electrode, which was constructed of said fibres of approximately 10 μm thickness and which had a porosity of approx. 95%, had a specific surface area of approximately 200 cm$^2$/cm$^3$. The CaCO$_3$ precipitate is expressed in mg/h per cm$^2$ of geometrical surface area. The temperatuare at which the electrolysis was carried out was room temperature. The liquid speed in the cathode was 8 cm/s. As anode a platinum gauze electrode was used.

In FIG. 1 the rate of precipitation of CaCO$_3$ per unit surface area of, on the one hand, the platinum cathode (1) and, on the other hand, the fibre cathode according to the invention (2) is shown for solutions containing 0.05M NaCl and $10^{-3}$M $Ca(HCO_3)_2$.

In FIG. 2, which is an enlarged reproduction of the initial section of FIG. 1, the difference between the "scaling" on the cathode according to the prior art (1) and on the fibre cathode according to the invention (2) is given in more detail.

In FIG. 1 the rate of precipitation of $CaCO_3$ is also shown for water containing $10^{-3}$M $Ca(HCO_3)_2$ and 0.5M NaCl curve (3) in FIG. 1 is for the fibre cathode according to the invention and curve (1) in FIG. 1 substantially reflects the behavior of the platinum cathode according to the prior art).

As is evident from FIGS. 1 and 2, for a constant current density virtually no deposition of precipitate takes place at the fibre electrode according to the invention, while rapid precipitate formation takes place at the platinum cathode according to the prior art.

What is claimed is:

1. Method for the electrolytic preparation of hypochlorite in flowing water containing from about 0.05M to 0.5M chloride ions, comprising converting the chloride ions to hypochlorite utilizing an electrolysis reactor, wherein the cathode of the electrolysis reaction has an open structure and a surface area of at least 100 $cm^2/cm^3$.

2. Method according to claim 1, wherein the cathode was a specific surface area of 100-600 $cm^2/cm^3$.

3. Method according to claim 1, wherein the cathode consists of a material constructed of fibres.

4. Method according to claim 3, wherein the cathode is constructed of graphite or carbon fibres.

5. Method according to claim 3, wherein the cathode consists of woven or felt material.

6. Method according to claim 3, wherein the cathode is constructed of metal fibres.

7. Method according to claim 1, wherein the cathode consists of a material, constructed of fibres having a thickness of 2-25 $\mu$m, which as a porosity of 0.7-0.98.

8. Method according to claim 7, wherein the cathode consists of a material constructed of fibres having a thickness of 5-15 $\mu$m.

9. Method according to claim 1, wherein the cathode is constructed of a sponge material or of a granular stack.

10. A method for disinfecting flowing water containing about 0.05M to about 0.5M chloride ions, comprising passing the water through an electrolysis reactor which converts the chloride ions to hypochlorite, wherein the cathode of the electrolysis reactor has an open structure and a specific surface area of at least 100 $cm^2/cm^3$.

11. A method according to claim 10, wherein the water contains about 0.05M NaCl.

* * * * *

UNITED STATES PATENT AND TRADEMARK OFFICE
CERTIFICATE OF CORRECTION

PATENT NO. : 4,786,380

DATED : November 22, 1988

INVENTOR(S) : Pieter J. Van Duin et al.

It is certified that error appears in the above-identified patent and that said Letters Patent is hereby corrected as shown below:

First page, Item 56, add the following to the list of "U. S. PATENT DOCUMENTS": --3,974,051  8/1976  Elliott et al.--

Column 4, line 2, "was" should read --has--;

Column 4, line 13, "as" should read --has--.

Signed and Sealed this

Sixth Day of June, 1989

Attest:

DONALD J. QUIGG

Attesting Officer

Commissioner of Patents and Trademarks